April 3, 1956  E. THOMPSON, JR  2,740,264
APPARATUS FOR PRODUCING FROZEN CONFECTIONS
Filed Aug. 31, 1951  5 Sheets-Sheet 1
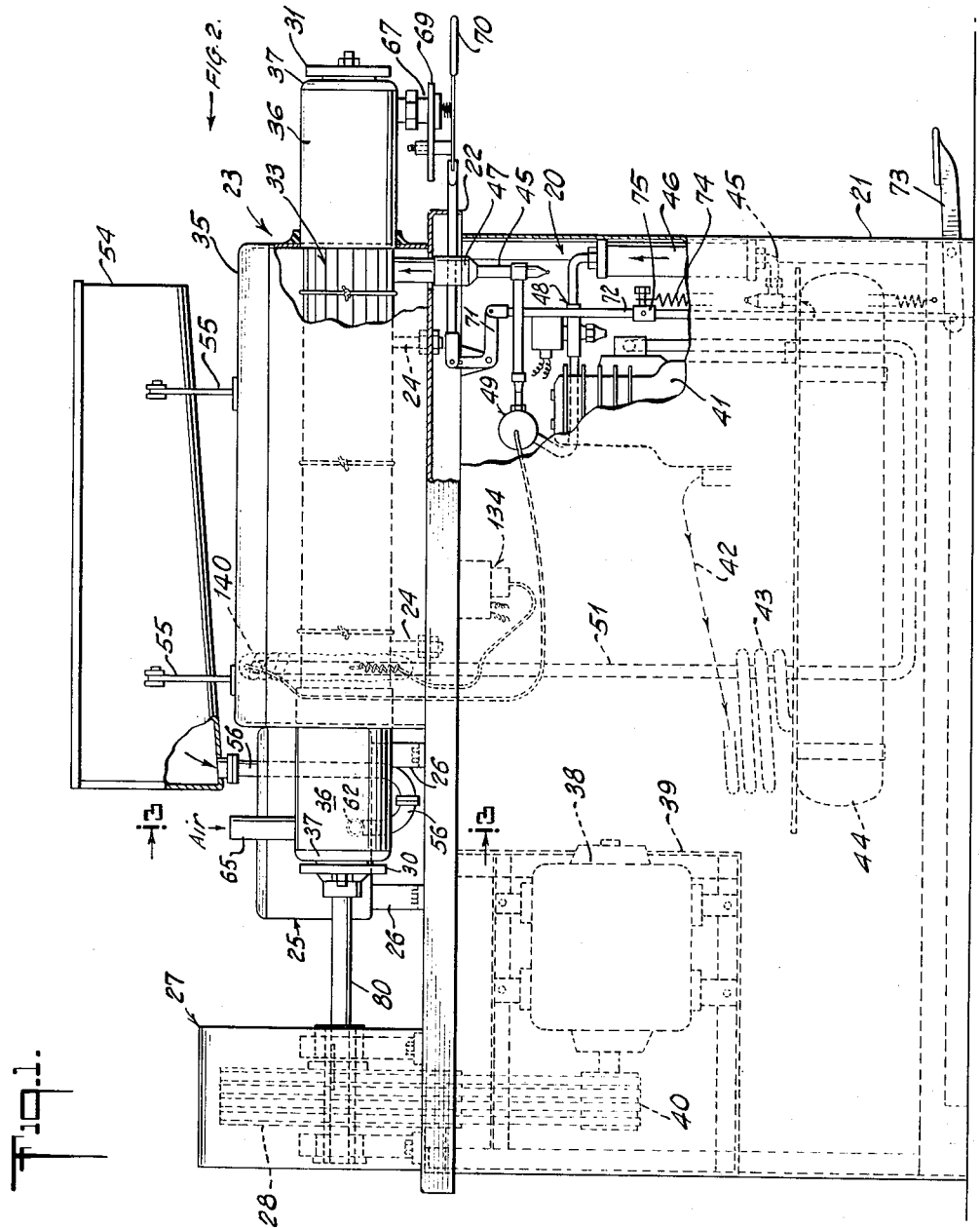
INVENTOR:
EMERY THOMPSON Jr.
BY
Watson Johnson Leavenworth & Blair
ATTORNEYS:

April 3, 1956     E. THOMPSON, JR     2,740,264
APPARATUS FOR PRODUCING FROZEN CONFECTIONS
Filed Aug. 31, 1951     5 Sheets-Sheet 2
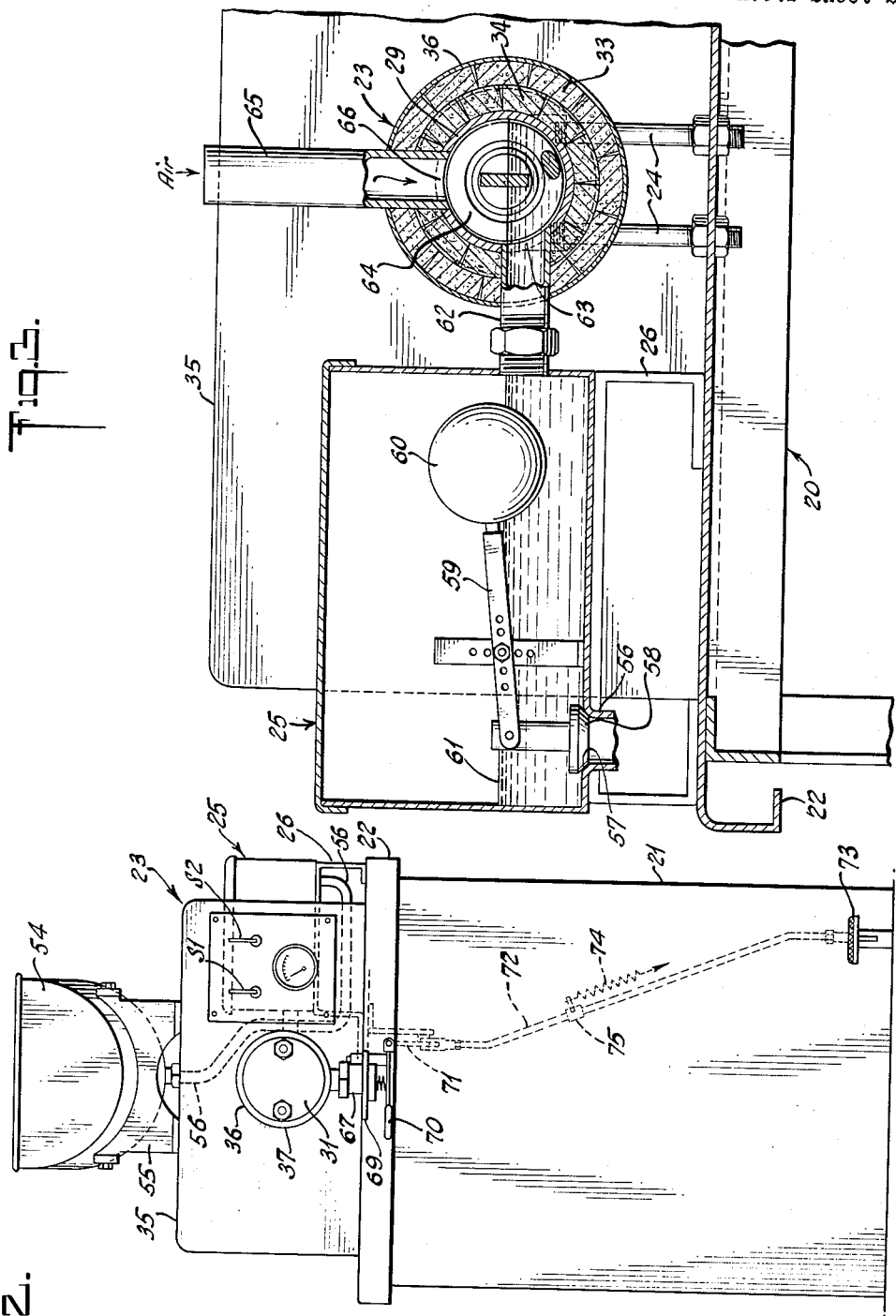
INVENTOR:
EMERY THOMPSON Jr.
BY
Watson, Johnson, Leavenworth & Blair
ATTORNEYS:

April 3, 1956     E. THOMPSON, JR     2,740,264
APPARATUS FOR PRODUCING FROZEN CONFECTIONS
Filed Aug. 31, 1951     5 Sheets-Sheet 3
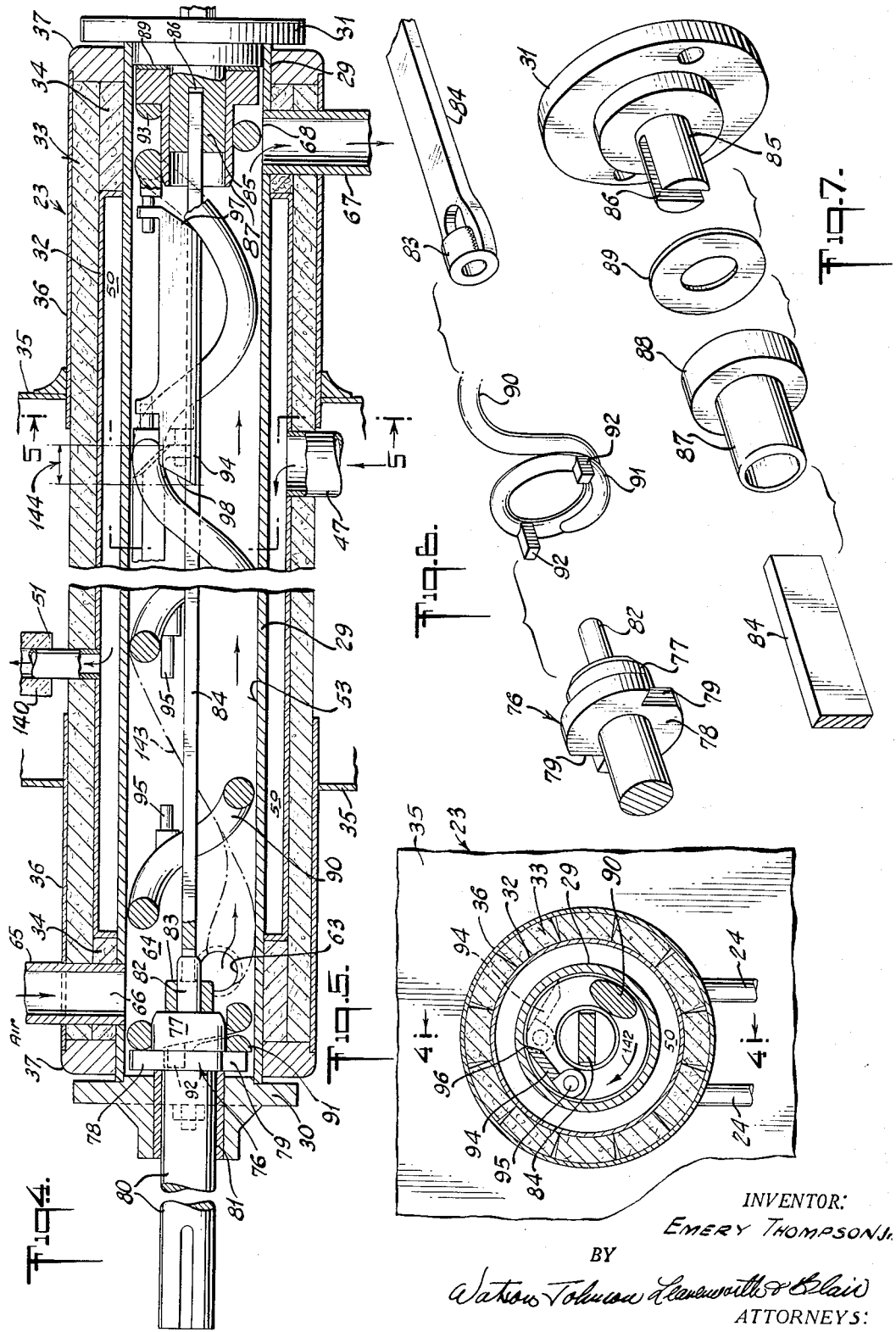
INVENTOR:
EMERY THOMPSON Jr.
BY
ATTORNEYS:

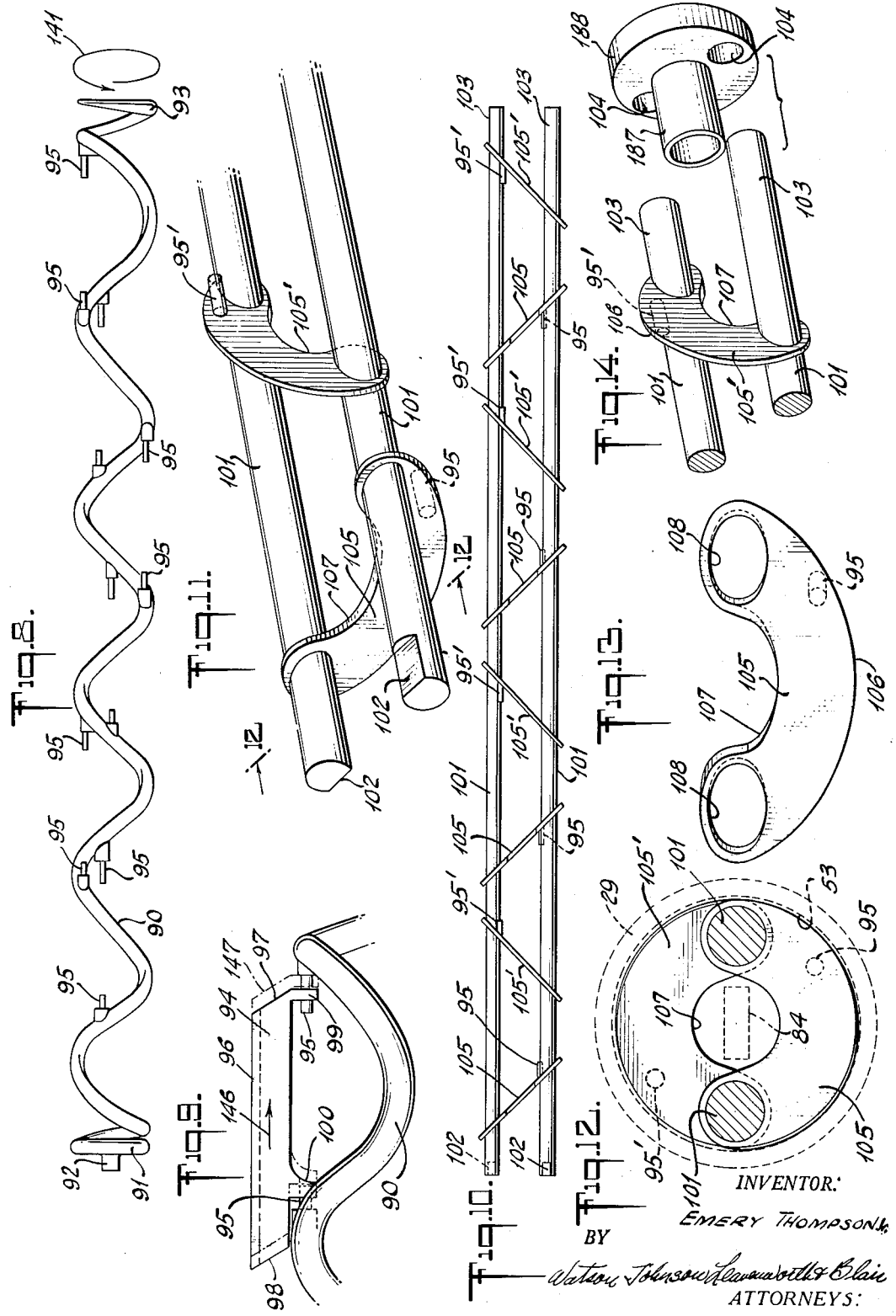

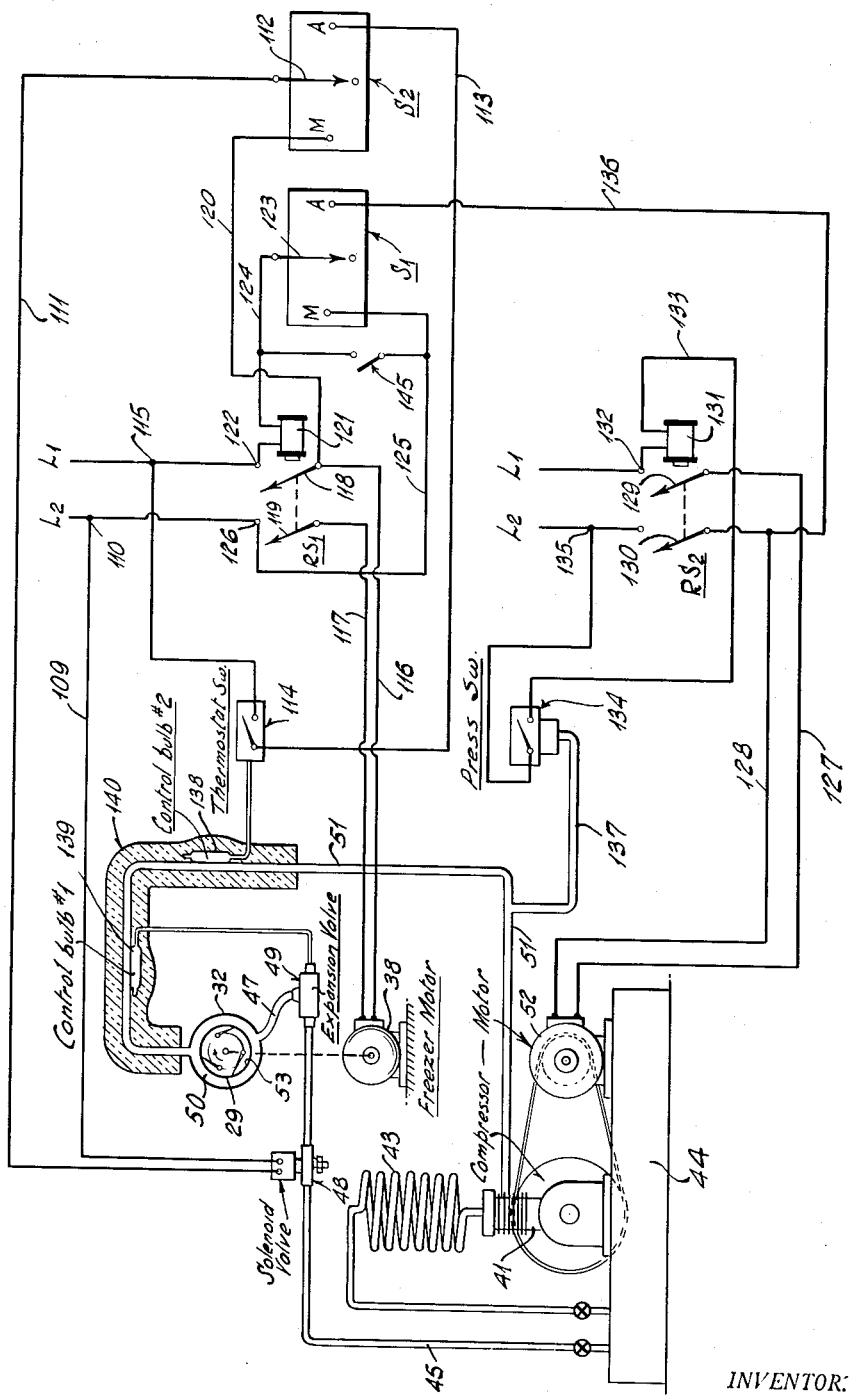

United States Patent Office 2,740,264
Patented Apr. 3, 1956

2,740,264

APPARATUS FOR PRODUCING FROZEN CONFECTIONS

Emery Thompson, Jr., New Rochelle, N. Y., assignor to Emery Thompson Machine & Supply Company, New York, N. Y., a corporation of New York Application August 31, 1951, Serial No. 244,630

8 Claims. (Cl. 62—4)

The present invention relates to apparatus for making and serving frozen confection products and to operating mechanism and control systems thereof, such devices, though capable of producing a variety of types of frozen products, being most familiar to the public in the production and sale of the frozen confection called "frozen custard."

A general object of the present invention is to provide such apparatus and control system thereof which are easily and simply made in an economical and rapid manner in mass production, the parts being readily assembled with minimum manipulation, the devices efficiently being operable in an assured and fool-proof manner to permit the most unskilled of operators consistently to produce a high quality product while avoiding operational shutdown directly attributable to incautious manipulation of controls.

A more specific object of the present invention is to provide simple freezer structure featuring uncomplicated supply of liquid stock and gaseous medium for efficient attainment of a desired degree of overrun in the plastic product and with simple automatic control of the supplies thereof.

Another object of the present invention is the provision of simple but sturdy and effectively operable dasher structure which is easily and economically made and readily serviced and cleaned.

A further object of the present invention is to provide a control system for such freezer apparatus which is efficiently sensitive to return conduit temperature so as to assure most effective control of the temperature of the frozen plastic product in the freezer within the limits of a narrow range of temperatures, such as $\pm \frac{1}{2}°$ F. of 24° F.

Still another object of the present invention is to provide structural embodiments of the apparatus and parts thereof which may be readily constructed and permit efficient use and operation.

Other objects of the invention will in part be obvious and will in part appear hereinafter.

The invention accordingly comprises the features of construction, combination of elements and arrangement of parts, which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

Fig. 1 is a side elevational view, with parts broken away and in section, and others diagrammatically shown, of an embodiment of apparatus of the present invention for producing frozen confections;

Fig. 2 is a front end elevational view of the apparatus shown in Fig. 1;

Fig. 3 is a sectional view, to an enlarged scale, with parts broken away and in section, taken substantially on line 3—3 of Fig. 1;

Fig. 4 is an axial section, to an enlarged scale, with parts broken away, of the jacketed cylinder and an embodiment of the dasher structure of the apparatus shown in Fig. 1 and taken substantially on line 4—4 of Fig. 5;

Fig. 5 is a detailed transverse section taken substantially on line 5—5 of Fig. 4;

Fig. 6 is an exploded perspective view, with parts broken away and in section, of a portion of the dasher structure and the driving means therefor at the inlet end which are shown in Figs. 4 and 5;

Fig. 7 is a view similar to Fig. 6 of parts of the other end of the dasher structure shown in Figs. 4 and 5;

Fig. 8 is a side elevational view to a reduced scale of the feed part of the dasher structure shown in Figs. 4 to 7, incl.;

Fig. 9 is an enlarged detail of dasher structure shown in Figs. 4 to 8, incl.;

Fig. 10 is a plan view of the feed part of a modified form of dasher structure;

Fig. 11 is an enlarged perpsective detail of the receiving end of the dasher structure embodiment shown in Fig. 10;

Fig. 12 is a sectional view taken substantially on line 12—12 of Fig. 11 and showing in dotted lines the cylinder in which it is to be rotated and a whipping or mixing bar which may be employed therewith;

Fig. 13 is an enlarged perspective side view of one of the agitating and advancing blades of the dasher structure embodiment shown in Figs. 10, 11 and 12;

Fig. 14 is a perspective exploded detail, with parts in section, of the discharge end of the dasher structure shown in Figs. 10 to 13 incl., showing means for support thereof; and Fig. 15 is a diagrammatic or schematic view of a control system employable to advantage in the apparatus of Fig. 1.

Referring to the drawings, in which like numerals identify similar parts throughout, it will be seen that a preferred embodiment of the apparatus for producing frozen confections of the present invention may comprise a supporting base structure 20 encased by a casing 21 for suitably housing various parts and having a platform top 22 on which other parts are mounted. Upon the platform top 22 is suitably mounted in a lateral and preferably substantially horizontal position a freezer 23, such as by means of tie bolts 24—24, a temporary storage tank 25, such as by means of suitable bracket feet 26, 26, and a hood 27 suitably housing dasher driving means, such as a driven pulley and driving belt structure indicated in dotted lines at 28 in Fig. 1.

The freezer unit 23 comprises a lateral or substantially horizontal, elongated cylinder 29, suitably closed at its inlet end by head 30 and at its outlet by head 31. A mid-section of the cylinder 29 is surrounded by a refrigerant jacket 32 suitably covered by insulating means 33, such as a plurality of adjacent, longitudinally-extending cork strips which cooperate with underlying bands of insulation 34 beyond the ends of the jacket 32 and engaged directly about the exposed ends of the cylinder 29 protruding from opposite ends of the jacket, with such bands of insulation also preferably formed of longitudinally-extending cork strips, as will be seen from Figs. 3 and 4. A housing 35 covers the central section of the jacketed and insulated cylinder 29 and cylindrical covers 36, 36 cooperate with end plates 37, 37 to cover the insulation about the protruding ends of the cylinder.

Within the base casing 21 is suitably mounted the usual dasher-operating mechanism and refrigerant circulatory system. Such mechanism may comprise an electrical motor 38 supported on hanger structure 39 and suitably belted, such as at 40, to the pulley driving structure in housing 27, as shown in dotted lines in Fig. 1. The refrigerant circulatory system may comprise a compressor 41 connected by an outlet conduit diagrammatically shown at 42 through condenser coil 43 to the usual reservoir 44. From the reservoir 44, a supply conduit 45 for compressed refrigerant preferably feeds through a dehydrating dryer 46 to jacket inlet or supply duct 47, through a solenoid valve 48 and an expansion valve 49 connected in series. As shown in Figs. 1 and 4, supply duct 47 communicates at the bottom with heat exchanger space 50 inside jacket 32 within the housing 35. A return line duct 51 communicates with space 50 at the top, also within the jacket 35, to extend down through a hole in platform top 22 into the base housing 21 for return connection to compressor 41, as seen in Figs. 1 and 4. The compressor 41, of course, includes suitable motive means, such as a self-contained electrical motor indicated at 52 in Fig. 15.

The means for supplying fluid or liquid stock to cylindrical freezing chamber 53 provided by the interior of the cylinder 29 preferably comprises an elevated storage supply tank 54 mounted for gravity feed above the freezer unit 23 and preferably upon the casing 35 thereof by means of leg brackets 55, 55, as shown in Figs. 1 and 2. An eduction pipe 56 connects a low point of the bottom of the interior of the tank 54 to the bottom of temporary storage tank 25 so as to feed fluid stock to the latter by force of gravity. The outlet opening of the eduction pipe 56 is circumscribed by a valve seat 57 on which seats a float-operated lift valve 58, suitably connected by linkage and lever means 59 to a float 60 located within tank 25 to control the supply thereto of liquid stock and while amounts of the latter are withdrawn to maintain automatically therein the quantity of stock at a uniform level, such as that indicated at 61 in Fig. 3. Fluid stock is fed from temporary storage tank 25 to the inlet end of the cylinder 29, which is closed by head 30, by a suitable duct in any suitable manner at a point preferably below the level 61 dictated by float 60. Preferably, for this purpose, a pipe 62 extends laterally to connect the interior of tank 25 to an inlet opening 63 in the side of the inlet end of the cylinder 29, and preferably the top of that inlet opening and the top of the passage provided by the interior of pipe 62 are located substantially at the level 61 which in turn is preferably in the vicinity of the axis of the cylinder, as indicated in Fig. 3. As a result, an appreciable gas head space 64 is provided above the level 61 of the top of the fluid stock as it is supplied to the chamber 53 through the inlet opening 63.

Gaseous medium, such as carbon dioxide, nitrous oxide, etc., but preferably air, is supplied directly to the gas head space 64 in the cylinder chamber 53 at the inlet end. For this purpose, a stand pipe 65 is preferably provided to communicate the atmosphere with a gas inlet opening 66 in the top of the inlet end of the cylinder 29, as shown in Figs. 1, 3 and 4. This provides the necessary gas requirements for producing the desired aerated condition known as "overrun," fully discussed in my Patent No. 2,132,364 of October 4, 1938. When pipe 65 is open to atmosphere for supply of air to attain the desired degree of overrun, it may serve as a simple means whereby fruit or other ingredients may be added in a ready manner by the operator.

As shown in Figs. 1, 2 and 4, the outlet end of the freezer unit 23 is provided with a suitably gated discharge passage which may comprise a depending tube 67 communicating with the chamber 53 by way of discharge opening 68 and closed at its bottom end by pivoted gate 69 to be swung laterally by a manual handle 70. Manual handle 70 is linked through a bell crank lever 71 to a lift rod 72 pivotally connected to a foot pedal 73, with the rod spring-biased downwardly by suitable spring means 74 anchored to the rod in any suitable manner, such as by fixture 75. Fixture 75 may, if desired, be employed to operate a circuit closing switch for energizing the freezer motor, as more fully explained hereinafter in connection with Fig. 15. Thus, either by depressing foot lever 73, or by swinging hand lever 70 to one side, gate 69 may be caused to uncover the outlet of discharge tube 67 for delivery of frozen confection in a plastic condition for consumer consumption.

Although a variety of types of dasher constructions may be used in such freezer apparatus, simplified economically constructed unique dasher structure of my invention is preferred. Such dasher structure comprises agitating and whipping rotary mechanism of open screw construction having through passages from end to end in order to beat into the supplied stock the necessary amount of gas to attain the desired degree of overrun and, while it is being beaten and frozen to a plastic aerated product, to advance or feed it to the gated outlet for delivery to customers.

An embodiment of such dasher construction is shown in Figs. 3 to 9 inclusive. As therein indicated, such dasher construction may comprise a rotary driving head 76 having a stepped cylindrical core element 77 extending coaxially from a circular flange 78 provided with a pair of diametrically-arranged driving notches 79, 79. The driving head 76 preferably is provided as an integral part of the driving shaft 80 suitably rotatably supported in a journal 81 extending axially through closing head 30, with the shaft adapted to be driven by the pulley construction 28. The smaller stepped portion of core element 77 preferably constitutes an axial extension 82 to be slidably and rotatably received in a collar 83 fixed on one end of a whipping bar 84. Preferably, the whipping bar 84 is rectangular in section and provided as a flat strip, although a variety of other shapes might be used. The other closing head 31 carries a fixed, inwardly-extending stub shaft 85 having a transverse slot 86 therein to receive and hold the other end of mixing or whipping bar 84. A rotatable sleeve 87 is slidably mounted on stub shaft 85 and has an enlarged head 88 bearing against a thrust washer 89. Thus, the mixing or whipping bar 84 will be held stationary by the stub shaft 85 while the sleeve 87 may rotate on the latter.

The agitating and advancing or feeding structure of the dasher construction may comprise a spiralled rod 90 having a complete turn 91 at one end to be slidably received over the larger portion of core 77 carried by driving head 76. Turn 91 carries diametrically-arranged, axially-extending driving lugs 92, 92 to be received in driving head notches 79, 79. The turns of the spiralled rod 90 are preferably of an outside diameter slightly less than the internal diameter of chamber 53 so as to be freely rotatable therein while assuring obtainment of maximum thrust. The other end of the spiralled rod 90 has a turn 93 therein to receive the reduced portion of the rotatable sleeve 87 for support thereby.

In order to scrape the frosted material as it is formed on the inside face of chamber 53 therefrom and beat it back into the body of stock and/or forming plastic material, the spiralled rod 90 is provided with a plurality of centrifugally-cockable, longitudinally-extending scraper blades 94—94 so arranged that their sharp leading edges overlap longitudinally to scrape clean the entire inner surface of the freezing chamber opposed to the dasher construction. For support of each scraper blade 94, successive turns of the spiralled rod 90 are provided with opposed pairs of pivot pins 95, 95. Preferably each scraper blade 94 is of a shape similar to that shown in Figs. 4, 5 and 9, having a sharp leading edge 96, an oblique front edge 97, and an oblique rear edge 98 arranged substantially parallel to the front edge. Each scraper blade 94 is provided with a pair of longitudinally-spaced apertured base ears 99 and 100 respectively to receive the front and rear pivot pins of each pair 95, 95. Fig. 9 illustrates the simplicity of mounting such a scraper blade on an opposed pair of pivot pins 95, 95 wherein it is shown that with the scraper blade swung radially out away from the spiralled rod 90, the front apertured ear 99 may be positioned over the preferably longer front pivot pin 95 and pushed forward in the direction of the arrow to the dot-dash position 147 so that the rear apertured ear 100 may be slipped over the end of the preferably shorter rear pivot pin. The scraper blade is then slid back to the full line position shown in Fig. 9 and permitted to drop down so that its oblique front edge 97 rests in the vicinity of an adjacent portion of the turn of the spiralled rod 90 supporting it, as indicated in Fig. 4. Thus, as the dasher construction is rotated to feed the plastic material forward through the cylinder chamber 53 by screw action, the action of those scraper blades 94—94 and drag of material thereon is prevented from dislodging or dismounting the scraper blades, while permitting their ready removal for conditioning and sharpening. Limited longitudinal motion of each scraper blade 94 in either direction is possible when the dasher frame and blades are disposed in and rotated in the whipping chamber 53, but it is limited to an extent preventing disengagement of ears 99 and 100 from pivot pins 95, 95.

A further simplified form of the dasher construction which may be preferred is illustrated in Figs. 10 to 14 incl., and, as therein shown, may comprise a pair of parallel, longitudinally-extending, laterally-spaced rods 101, 101 having their ends at the inlet end of the apparatus flatted at 102, 102, as shown in Fig. 11, to be suitably received and fitted in driving notches 79, 79. The opposite ends 103, 103 of the rods 101, 101 are adapted slidably to be received in diametrically-opposed holes 104, 104 in the face of flange 188 of a modified form of rotatable sleeve 87 to be mounted on stub shaft 85. The pair of parallel rods 101, 101 carry at spaced intervals two sets of like blades 105—105, and 105'—105', with those in one set 105—105 arranged obliquely forward with respect to transverse planes, and alternate ones of the other set 105'—105' arranged obliquely back away from such transverse planes, as most clearly seen in Fig. 10. The blades 105—105 of one set are located on one side of the pair of rods 101, 101, and those of the other set 105'—105' on the opposite side, as will be seen from Figs. 11 and 12, so that together they form a screw structure adapted when rotated to advance plastic material from one end to the other.

Each blade 105 or 105' has an outer edge 106, substantially arcuate in shape and extending about 180°, to be rotated closely adjacent to the inner cylindrical surface of the chamber 53, as shown in Fig. 12. Preferably the central portion at 107 of each blade 105 or 105' is cut away, as indicated in Figs. 11, 12 and 13, to provide clearance for a whipping or mixing member, such as fixed bar 84. Thus each blade 105 or 105' may be generally C-shaped in outline, with the tips thereof apertured at 108, 108, as indicated in Fig. 13, slidably to receive the rods 101, 101, on which the blades may be thereafter fixed in proper positions in any suitable manner, such as by welding, although other means carried thereby may be employed properly to space them. It will be understood, however, that the central portions of each blade 106 need not be cut away at 107 if the use of a mixing or whipping bar is not desired, or each blade may be somewhat fan-shaped and have a medial aperture in the area 107 to receive such a mixing or whipping bar.

Successive blades of each set obliqued in the same direction (105, 105 or 105', 105') carry a pair of the opposed pivot pins (95, 95 or 95', 95') so that one of the scraper blades 94, or a scraper blade of modified construction, may be mounted thereon in a manner similar to that previously described. Thus, the front end of a scraper blade mounted upon opposed pivot pins 95, 95, on a pair of forwardly-obliqued blades 105, 105 on one side of the rods 101, 101, will have its front end longitudinally overlapped by the rear end of the next succeeding scraper blade pivotally mounted on the opposed pair of pivot pins 95', 95' of a pair of blades 105', 105 obliqued in the opposite direction to the rear and with the rear blade of that pair intervening the two blades of the former pair. Accordingly, the entire cylindrical inner surface of the chamber 53 opposite the dasher construction illustrated in Figs. 10 to 14 inclusive, will be scraped effectively by such blades in rotation of the dasher construction.

An efficient control system for an embodiment of the apparatus of the present invention is diagrammatically illustrated in Fig. 15. As therein indicated, the valve 48 may be of the solenoid type, having one end of an actuating magnetic coil connected by wire 109 to one side "L2" of a supply circuit at 110. The other end of the solenoid valve actuating coil is connected by a wire 111 to the movable mid pole 112 of a single pole, double throw switch "S2," with one fixed terminal thereof marked "A" (automatic) connected by wire 113 through a thermostat switch 114 to the other side "L1" of the supply circuit at 115. The freezer motor 38 is connected by wires 116 and 117 to output terminals of a double pole, single throw relay switch "RS1," so that the blades thereof 118 and 119 may be moved respectively to conductive contact with supply circuit conductors "L1" and "L2" so as to energize and operate the freezer motor. The other terminal "M" (manual) of switch "S2" is connected by a wire 120 to one output terminal of the freezer motor relay switch "RS1," as shown, so that when that switch is closed, a circuit may be completed from one side of the supply circuit "L1" through wire 120, switch "S2," wire 111, the coil of solenoid valve 48 and wire 109 to the other side of the supply circuit "L2."

The relay switch "RS1" is provided with the usual closing magnetic coil 121 which is connected between one side "L1" of the supply circuit at 122 and a terminal 123 of another control switch "S1" by wire 124. Control switch "S1" has one terminal "M" (manual) connected by wire 125 to the other side "L2" of the supply circuit at 126 so that with closure of switch "S1" on the manual setting, relay coil 121 will be energized to close relay switch "RS1" for running freezer motor 38.

Compressor motor 52 is connected by wires 127 and 128 to output terminals of a second relay switch "RS2" so that when the movable contacts 129 and 130 thereof are brought to contact with terminals connected to supply circuit lines "L1" and "L2," the compressor motor will be energized and run. Relay switch "RS2" is closable by the usual magnetic coil 131 connected between one side "L1" of the supply circuit at 132 by a wire 133 through a pressure responsive switch 134 to the other side "L2" of supply circuit line at 135. Control switch "S1" has its other terminal "A" (automatic) connected by a wire 136 to one output terminal of the second relay switch "RS2" so that with switch "S1" on automatic setting the coil 121 of the first relay switch "RS1" will be energized through the compressor motor relay switch "RS2" only when the latter is closed.

The pressure switch 134 is connected to the refrigerant return line 51 for fluid operation by the back pressure therein by means of a pipe or duct 137. The thermostat switch 114 is controlled and operated by a suitable thermal element, such as "control bulb #2" at 138, and the expansion valve 49 is suitably operated and controlled by a similar thermal element "control bulb #1" at 139.

An important feature of the control system of the present invention comprises location of the control bulbs 138 and 139 along the return conduit 51 in heat transfer association therewith, and at locations substantially thermally remote from the heat transfer space 50 jacketing the freezer chamber. It has been found that by such location of such thermally responsive control bulbs, the temperature of the frozen plastic material in the freezer can be maintained more efficiently within a narrow range of variation of temperature, for example, as preferred about ±½° F. of 24° F. In order to assure such control response to the temperature of the return conduit, a field of temperature influence is defined by a suitable body of insulation 140 in which the two control bulbs are embedded at 138 and 139. The temperature in that field of temperature influence preferably is further tempered by the temperature of the atmosphere through heat transfer by conduction along the return conduit 51 from a point where it is exposed to contact with the atmosphere back to the points of location of the control bulbs and, more particularly, to the location of control bulb #2 at 138 which operates or controls the thermostat switch 114, the latter on automatic setting of the switches being responsive to open and close the solenoid valve at 48. Thus, at least a section of the return conduit 51 is made of heat conducting material, such as copper or brass tubing, with a portion of that section being exposed to contact with the atmosphere and another portion thereof being embedded in the body of insulation 140 to lie adjacent the control bulbs at 138 and 139 for heat transfer to the latter.

In operation of the freezer apparatus shown in Figs. 1 to 9 inclusive, liquid confection stock contained in the elevated storage supply tank 54 will be permitted to flow through duct 56 into temporary storage tank 55 with valve 58 lifted by virtue of the low position of float 60. As float 60 rises with increase in the quantity of stock collected in tank 25, valve 58 will finally close the orifice in seat 57 with the surface of the liquid substantially at the level 61. Liquid stock will flow through conduit 62 and inlet opening 63 into the inlet end of freezer chamber 53, and with the body of the stock therein superposed by a head of air in space 64 in direct communication with the atmosphere through gas inlet opening 66 and gas supply stand pipe 65.

The rotary dasher structure in the freezer chamber 53 will then be rotated in a counter-clockwise direction as the dasher structure is viewed from the front or discharge end of the freezer, as indicated by the arrow 141 in Fig. 8 and arrow 142 in Fig. 5. The dasher structure is so rotated by means of shaft 80, drive pulleys 28 and 40 belted together, and freezer motor 38 which is suitably energized in one of a number of possible ways as hereinafter explained. The compressor motor 52 is energized suitably to operate compressor 41 so that pressure of refrigerant is built up in reservoir 43 to be supplied by supply conduit 45 through the open solenoid valve 48 and the open expansion valve 49, and thence through duct 47 to the heat transfer space 50 about the freezing chamber 53. With heat being withdrawn from the fluid stock in the freezer as it is beaten and whipped, frosted amounts thereof tend to build up on the inner wall of the freezer cylinder 29. Rotation of the dasher structure causes the scraper blades 94—94 carried thereby to be swung outwardly or cocked by centrifugal action so that their sharp noses or leading edges 96—96 will scrape the frost from the wall of freezing chamber 53 to mix it back into the body of supplied material and to be churned up therein by cooperative action of the rotating spiral, the scraper blades, and the effect of the fixed flat mixing bar 84. As a result, partial solidification of the confection stock will cause it to become of plastic consistency and the resultant plastic body to be driven forward by the rotating dasher structure to the discharge outlet 68.

The dot-dash line at 143 in Fig. 4 indicates the approximate surface shape of the supplied stock and partially frozen confection material as it is being frozen and agitated, and, as therein indicated, there is a substantial gas head space 64 thereabove at the inlet end to permit supplied gas or air to be whipped or beaten into the supplied stock as it is agitated in the freezer and chilled to freezing with attainment of the desired degree of overrun. The removal of the frost from the inner surface of the freezing chamber 53 by the series of scraper blades 94—94 is assured by virtue of the fact that longitudinally the rear and front ends of successive blades overlap. This will be evident from an inspection of Fig. 4 wherein appreciable overlap is indicated at 144.

The frozen confection in a plastic condition having the desired degree of overrun will be withdrawn at will through the discharge outlet 68 and discharge 67 by opening the gate 69 with lateral swing, either by swinging the hand lever 70 to one side or depressing the foot pedal 73. Of course, at such times the freezer motor 38 must be operating the dasher structure in order to cause the latter to feed the plastic material forward by screw action. This can be accomplished in one of two ways. For example, if the movable contact 123 of switch "S1" be moved over to the manual position to close the circuit at the fixed contact "M," the relay coil 121 will be connected directly across the electrical supply line to energize it and close switch "RS1," which connects the freezer motor 38 to the electrical supply line. Such energization of the freezer motor 38 may be effected automatically with opening of the discharge gate 69 by providing an automatically-operated circuit closing switch 145 in shunt of the manual setting of switch "S1" or, in other words, connected directly across between wires 124 and 125. Such a circuit closing switch 145 can be of a type wherein a biasing spring tends to maintain it open with operating means opposing the force of the biasing spring to close it. The operating means may be connected in any suitable manner to any portion of the linkage connected between the manual lever 70 and the foot pedal 73, and for this purpose may, for example, be connected to the biasing spring anchorage 75 fixed on the rod 72.

The modified form of dasher structure shown in Figs. 10 to 14 inclusive not only effectively accomplishes all of the operational functioning of the embodiment shown in Figs. 4 to 9 inclusive, but in addition, may be found to be much more readily constructed and manufactured in mass production. As will be noted from the drawings, that second embodiment of the dasher structure is extremely simple and the parts thereof are readily and easily assembled to assure economy in production. Further, that structure permits ready mounting in the freezer, allows efficient agitating and screw advancing operations thereof, and also permits easy, quick and simple cleaning and servicing. Obviously, the scraper blades similar to 94 which will be employed with the dasher structure shown in Figs. 10 to 14 inclusive, are mounted and demounted in a similar simple manner. For example, as shown in Fig. 9, in order to remove the scraper blade 94, one need merely to rotate it so that it extends upwardly or radial of the dasher structure proper, and move it in the forward direction indicated by the arrow 146 to the dot-dash position 147, so as to free the rear apertured ear 100 from the rear pivoting pin 95 to permit the front apertured ear 99 to be slid back off of front pivot pin 95. Such easy removal permits sharpening of the scraper blade and any truing up or other servicing thereof that may be necessary.

The control system of Fig. 15 will permit by proper setting of the two control switches "S1" and "S2," indicated on the front of the apparatus in Fig. 2, to be manipulated to either manual operation or automatic operation positions so as to control operation of the freezing apparatus in the following manners. For example, closure of switch "S1" to the manual position by swinging its movable contact 123 over to the fixed contact "M" will, as previously explained, connect the coil 121 of relay switch "RS1" across the electrical supply line "L1"—"L2" to close that switch and energize the freezer motor 38. Freezer motor 38, of course, rotates the dasher structure in the freezer cylinder to prepare frozen confection having the desired overrun, and to drive it forward to the outlet end of the freezer cylinder to be discharged through the gated discharge opening at the will of the operator to supply a customer demand. The solenoid valve 48 which primarily controls circulation of the refrigerant in the refrigerating duct system cannot be turned on or, that is, opened by energization of its coil unless the freezer motor is running when switch "S2" has it movable contact 112 also moved over for circuit closing at the manual position at "M." This, of course, is due to the fact that while one end of the solenoid valve coil is connected at 110 to line "L2," connection to line "L1" is through the freezer motor energizing relay switch "RS1," wire 120 and switch "S2" when positioned on manual setting. Thus, the freezer motor may be operated alone without circulation of refrigerant by closing coil circuit of "RS1" either by manual setting of switch "S1" or by shunt switch 145 operable by the gate link, and this, of course, permits delivery from the freezer of frozen plastic confection product by motor drive of the dasher structure, while making it necessary that the dasher structure be rotated by the freezer motor in order to obtain circulation of refrigerant when switch "S2" is also at manual setting. This precaution, of course, assures that there can be no such undue build-up of solidified frozen material on the inner walls of freezing chamber 53 as would prevent proper operation of the device, either by slowing or totally preventing rotation of the agitating and feeding dasher structure.

Under such manual setting operation, and with the thermostat switch 114 open, control bulb #1 at 139 solely controls the temperature within the freezer since expansion valve 49 is controlled by that control bulb in response to return duct temperature, and circulation of refrigerant as dictated by the opening of the expansion valve 49. Respose to control of the bulb at 139 presumes that the solenoid valve at 48 is open by energization of its coil with the control switch "S2" on manual setting and with the freezer motor operating as a result of closure of relay switch "RS1" with control switch "S1" also on manual setting. The back pressure created in the return duct 51 by vaporization of refrigerant beyond the expansion valve 49 and through the freezer jacket chamber 50 closes the pressure switch 134 to connect the coil 131 of relay switch "RS2" by wire 133 across the supply circuit lines "L1" and "L2" respectively between points 132 and 135. Thus, the compressor motor 52 which is energized by closure of relay switch "RS2" is under the sole control of pressure switch 134 as it responds to back pressure in the return duct 51 as conducted therethrough through duct 137.

When the control switches "S1" and "S2" are manipulated to automatic control settings, such as by swing of movable contact 123 of switch "S1" to its fixed contact "A" and swing of the movable contact 112 of switch "S2" to its fixed contact "A," the circuits and resultant operations of the apparatus are as follows. The coil 121 of relay switch "RS1" will be connected across the electrical supply line between "L1" at 122 and "L2" through contacts 123 and "A" of "S1" by wire 136 only when the relay switch "RS2" is closed, which, of course, is the switch that connects the compressor motor across the supply line. Consequently, relay switch "RS1" closes to energize and operate the freezer motor 38 only when relay switch "RS2" is closed to energize and operate the compressor motor 52. Relay switch "RS2" is closed only when the pressure switch 134 is closed by back pressure created in the return duct 51 by vaporization of the refrigerant. Thus, only when refrigerant is circulating to produce back pressure due to vaporization will the compressor motor 52 be energized through relay switch "RS2," and since the freezer motor 38 will run on automatic setting only when the compressor motor runs, the pressure switch at 134 controls operation of both motors.

On automatic setting with the second control switch "S2" manipulated to the automatic position so that the movable contact 112 closes the circuit at fixed contact "A" of "S2," the coil of the solenoid valve 48 will be connected across the supply line from the point 110 to the point 115 through the wire 113 and thermostat switch 114. The thermostat switch is manipulated by and under the control of the second control bulb at 138 which also responds to elevated temperature above a maximum of a field of temperature influence of the return duct at a point thermally remote from the freezer jacket. Thus, the temperature of the return duct 51 controls the operation of the thermostat switch 114 which in turn controls the operation of the solenoid valve 48, and the latter will be opened only by closure of the thermostat switch in response to elevation of temperature of the return duct. However, this does not assure circulation of refrigerant since the expansion valve must be opened by its control bulb at 139 also in response to the temperature of the field of temperature influence of the return duct. The elevated temperature beyond a predetermined maximum thus will cause expansion valve 49 to be opened in response to the control bulb at 139 and solenoid valve 48 to be opened by closure of the thermostat switch 114 responding to the other control bulb at 138. The consequent circulation of refrigerant in the system will develop back pressure for closure of the pressure switch 134 to cause relay switch "RS2" to close for energization of the compressor motor 52, and at such time with the compressor motor operating, the freezer motor will be operated.

Thus, on automatic setting, operation of the thermostat switch 114 by its control bulb at 138, in response to the temperature in the field of temperature influence of a portion of return conduit 51, dictates the operation of the flow of refrigerant through the refrigerant circulatory system (presuming that if the control bulb #1 at 139 is used it is also responding to that temperature to open expansion valve 49) to chill the walls of the freezing chamber and develop frost thereon. With the thermostat switch 114 closed, the freezer motor is operated to rotate the dasher structure in the freezer chamber so as to scrape the frost from the chamber walls, beat and whip it back into the body of supplied stock to form a frozen plastic product, also to beat into the supplied stock sufficient quantity of gas or air to attain the desired overrun, and also to feed the finished plastic product forward to the outlet end and through the gated outlet when opened for supply of customer demands. Thus, with the control switches "S1" and "S2" manipulated to automatic settings, the thermostat switch 114 and its control bulb #2 at 138 may be considered to be the master control device of the control system.

Also, though not entirely necessary, it is desirable to use a control bulb for dictating the setting of the expansion valve 49, such as that at 139, so that there will be temperature control of the flow of refrigerant through the refrigerant circulatory system at all times. As explained, whenever control switch "S2" is on manual setting, solenoid valve 48 is opened upon operation of the freezer motor 38 through closure of the relay switch "RS1." But, of course, rotation of the dasher structure by the freezer motor 38 is frequently desired when there is no demand for heat transfer from the confection material in the freezer, such as at times of developing overrun and delivering finished product from the freezer. Under such conditions when there is no refrigerant flow control by control bulb #2, control bulb #1 at 139 performs that function. On automatic setting of control switch "S2," of course, the solenoid valve 48 is connected across the supply line only through closure of the thermostat switch 114 operated by its control bulb #2 at 138, which, in turn, responds to the temperature of the field of influence of the return conduit temperature. Thus, the use of the two control bulbs #1 and #2 assures that circulation of refrigerant in its circulatory system is permitted only when the temperature of the field of temperature influence of the return conduit becomes higher than a predetermined maximum so as demand from one or more of the control bulbs operation of equipment which will permit such flow. Accordingly, no combination of manipulations of the two control switches "S1" and "S2"

is possible by an unskilled operator which will cause improper operation and possible development of sufficiently solid frozen material in the freezer as to retard unduly or prevent rotation of the dasher structure.

It will thus be seen that the objects set forth above, among those made apparent from the preceding description are efficiently attained and, since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In apparatus for producing frozen confections the combination with a freezer having a motor for operating a dasher thereof; and a refrigerant circulatory system therefor including heat exchanger means and a compressor having a motor, a solenoid valve and an adjustable expansion valve in series in a high pressure conduit means between said compressor and said freezer with each of said valves adapted to control flow of refrigerant in said system, and a low pressure return conduit means between said freezer and said compressor; of heat-responsive means to adjust said expansion valve located in a field of influence of the temperature of said return conduit means substantially theremally remote from the freezer proper and its heat exchange means; an electrical supply circuit for said freezer and compressor motors; and means to operate said solenoid valve including thermostat switch means electrically to connect it to said electrical supply circuit, and heat-responsive means to operate said thermostat switch means also located in said temperature field of said return conduit means substantially thermally remote from the freezer proper and its heat exchange means; said pair of heat-responsive means being adapted respectively to open said expansion valve and close said thermostat switch means for simultaneous opening of both of said valves at a predetermined elevated temperature of said return conduit means temperature field as distinguished from said freezer proper.

2. The freezing system as defined in claim 1 characterized by relay switch means to connect said compressor motor to said electrical supply circuit, pressure-responsive switch means to close said relay switch means, means to apply back pressure in said return conduit means to said pressure-responsive switch means to close the latter, other relay switch means to connect said freezer motor to said electrical supply circuit, and means to energize said freezer motor relay switch for closure thereof connected to said electrical supply circuit through said compressor motor relay switch.

3. The freezing system as defined in claim 2 characterized by switch means selectively to connect said freezer motor relay switch energizing means directly across said electrical supply circuit and simultaneously to break the circuit connection through said compressor motor relay switch means.

4. The freezing system as defined in claim 3 characterized by additional switch means selectively to connect said solenoid valve across said electrical supply circuit through said freezer motor relay switch means and simultaneously to break the circuit connection through said thermostat switch means.

5. In apparatus for producing frozen confections the combination with freezer structure including a freezer proper and a refrigerant circulatory system therefor including a heat exchanger in said freezer proper, a high pressure supply conduit means leading to the latter and a low pressure return conduit means leading from said heat exchanger; of heat-responsive means located in a field of influence of the temperature of said return line substantially thermally remote from the freezer proper and its heat exchanger, and a pair of valve means in said high pressure supply conduit means controlled by said heat-responsive means to be opened for circulation of refrigerant when the temperature of said field reaches a critical maximum; one of said valve means comprising solenoid valve means having an energizing electrical circuit including thermostat switch means operable by said heat-responsive means, the other of said valve means being an expansion valve also controlled by said heat-responsive means located in said field.

6. The freezing system as defined in claim 5 characterized by insulating means covering a portion of said return conduit means to define said temperature field, said heat-responsive means for said pair of valve means being covered by said insulating means in heat transfer relation to said return conduit means substantially thermally remote from said freezer heat exchanger.

7. The freezing system as defined in claim 6 characterized by said return conduit means having a section formed of heat conducting material with said insulating means covering one part of said section while another part thereof is exposed in heat exchange relation to the surrounding atmosphere for tempering the temperature in said field.

8. In apparatus for producing frozen confections the combination comprising a freezer having a motor for operating dasher feeding means thereof; a refrigerant circulatory system including a heat exchanger in said freezer, a compressor and storage unit having an operating motor, a high pressure supply conduit leading from the latter unit to said heat exchanger, and a low pressure return conduit leading from the latter to said unit; a solenoid valve and an adjustable expansion valve in series in said high pressure conduit with each adapted to control flow of refrigerant in said system with said solenoid valve having an operating coil to open it when energized; an electrical supply circuit for said freezer and compressor motors; a pair of relay switches each having a closing coil and respectively adapted to connect said motors to said circuit; a thermostat switch having heat responsive means to close it at elevated temperatures with said means located in heat transfer relation with respect to a heat-conductive section of said return conduit; insulating means housing a portion of said section to define a field of temperature influence thermally remote from said freezer heat exchanger with said heat responsive means located therein for protective isolation from the surrounding atmosphere, another portion of said section being exposed to the surrounding atmosphere for conductive tempering of the temperature of said field; other heat-responsive means also located in said field operating said expansion valve to permit flow therethrough at elevated temperature; a double throw switch alternately to connect said solenoid valve coil to said supply circuit through the freezer motor relay switch when closed and through said thermostat switch; a pressure-operated switch connected to said return conduit to be closed by refrigerant back pressure therein adapted to connect said compressor motor relay switch coil across said supply circuit to close the latter switch; and a second double throw switch alternately to connect said freezer motor relay switch coil to said supply circuit directly thereacross and through said compressor motor relay switch when the latter is closed.

References Cited in the file of this patent

UNITED STATES PATENTS

| | | |
|---|---|---|
| 2,064,131 | Tuscan | Dec. 15, 1936 |
| 2,077,865 | Wile | Apr. 20, 1937 |
| 2,163,995 | Fuller | June 27, 1939 |

(Other references on following page)

| | | | | | |
|---|---|---|---|---|---|
| 2,182,712 | Vogel | Dec. 5, 1939 | 2,385,243 | Wiegers | Sept. 18, 1945 |
| 2,188,551 | Kaltenbach | June 30, 1940 | 2,446,156 | Kolz | July 27, 1948 |
| 2,209,979 | Johnson | Aug. 6, 1940 | 2,537,431 | Stickel | Jan. 9, 1951 |
| 2,221,223 | Shaw | Nov. 12, 1940 | 2,559,032 | Tachella | July 3, 1951 |
| 2,304,094 | Holmen | Dec. 8, 1942 | 2,577,902 | McGrath | Dec. 11, 1951 |
| 2,328,810 | Johnson | Sept. 7, 1943 | 2,587,127 | Erickson | Feb. 26, 1952 |
| 2,338,362 | Smith | Jan. 4, 1944 | | | |